(12) United States Patent
Guey et al.

(10) Patent No.: US 7,313,110 B2
(45) Date of Patent: Dec. 25, 2007

(54) METHODS, SYSTEMS, AND COMPUTER PROGRAM PRODUCTS FOR ALLOCATING BANDWIDTH IN A RADIO PACKET DATA SYSTEM BASED ON DATA RATE ESTIMATES DETERMINED FOR ONE OR MORE IDLE TRANSMITTER/SECTOR SCENARIOS

(75) Inventors: Jiann-Ching Guey, Apex, NC (US); Leonid Krasny, Cary, NC (US)

(73) Assignee: Telefonaktiebolaget L.M. Ericsson (SE)

( * ) Notice: Subject to any disclaimer, the term of this patent is extended or adjusted under 35 U.S.C. 154(b) by 1079 days.

(21) Appl. No.: 10/267,223

(22) Filed: Oct. 9, 2002

(65) Prior Publication Data

US 2004/0071110 A1 Apr. 15, 2004

(51) Int. Cl.
*H04Q 7/00* (2006.01)
*H04J 3/16* (2006.01)
(52) U.S. Cl. ...................... 370/329; 370/468
(58) Field of Classification Search ........... 370/320, 370/252, 329, 335, 342, 468, 322, 336, 341, 370/345, 348, 443, 444, 437
See application file for complete search history.

(56) References Cited

U.S. PATENT DOCUMENTS 6,320,855 B1* 11/2001 Shi ........................ 370/332
6,400,928 B1* 6/2002 Khullar et al. ........... 455/67.11
6,564,060 B1* 5/2003 Hoagland .................... 455/450
6,574,211 B2* 6/2003 Padovani et al. ........... 370/347
6,865,389 B2* 3/2005 Lee et al. .................... 455/442
7,054,293 B2* 5/2006 Tiedemann et al. ......... 370/335

OTHER PUBLICATIONS

3GPP2 C.S0024 Ver 3.0. "cdma2000 High Rate Packet Data Air Interface Specification," (Dec. 5, 2001).

\* cited by examiner

*Primary Examiner*—Chau Nguyen
*Assistant Examiner*—Hicham B Foud
(74) *Attorney, Agent, or Firm*—Myers Bigel Sibley & Sajovec, P.A.

(57) ABSTRACT

Bandwidth is allocated in a radio packet data system by sending achievable data rate estimate information from an access terminal to an access network. The achievable data rate estimate information is associated with scenarios corresponding to state combinations of a plurality of transmitters in the access network in which each transmitter is in either a serving, active, or idle state and one or more of the plurality of transmitters is in the idle state in one or more of the scenarios.

30 Claims, 6 Drawing Sheets

METHODS, SYSTEMS, AND COMPUTER PROGRAM PRODUCTS FOR ALLOCATING BANDWIDTH IN A RADIO PACKET DATA SYSTEM BASED ON DATA RATE ESTIMATES DETERMINED FOR ONE OR MORE IDLE TRANSMITTER/SECTOR SCENARIOS

BACKGROUND OF THE INVENTION

The present invention relates to wireless communication technology, and, more particularly, to methods, systems, and computer program products for allocating bandwidth in a radio packet data system.

A radio packet data system generally comprises an access network (AN), a plurality of access terminals (AT), and the air interface defined between the two. The AN may further comprise a plurality of base stations or sectors with each of the base stations/sectors having a radio footprint associated therewith that covers a certain geographical area, which may overlap with those of neighboring base stations/sectors. One design metric that may be used in a best-effort radio packet data system is the manner in which system resources are allocated to ATs based on the signal conditions that the ATs experience.

In general, a conventional best-effort radio packet data system may be designed to allocate system resources, such as frequencies and/or time slots, to ATs in a proportional and fair manner based on the quality of the radio channel conditions that the ATs are experiencing. The ATs may communicate information to the AN that describes the quality of the radio channel conditions. The feed back information may include signal strength information, an ATs preferred serving base station/sector and/or data rate.

For example, as described in the "cdma2000 High Rate Packet Data Air Inteface Specification," Version 3.0, by the 3rd Generation Partnership Project 2, dated Dec. 5, 2001, the disclosure of which is hereby incorporated herein by reference, an AT may request data service from the AN by sending a message on the reverse link that indicates which base station/sector the AT prefers to receive data from and at what rate the data should be sent. The information fed back from an AT to the AN may be referred to as data rate control (DRC) information. In an HDR system, an AT determines the DRC information based on measurements taken during receipt of pilot symbols. FIG. 1A shows the time slot format of the HDR forward link channel. Each time slot is 1.66 ms long and has 2048 chips. The time slot is divided into two sub-slots. Each sub-slot or half time slot is further divided into a pilot chips field, which may be used for channel estimation and/or determination of DRC information, two medium access control (MAC) chips fields for control and signaling, and two data chips fields for data payload. The pilot field may be an all-one sequence and the MAC fields may contain control signaling, such as reverse power control commands and reverse activity indication. As shown in FIG. 1B, if a base station/sector does not have any data to send to the ATs in its coverage area, then the base station/sector transmits idle information during the data intervals.

In an HDR system, there are twelve data packet formats with nine different data rates ranging from 38.4 kbps to 2457.6 kbps. During a data service session, an AT monitors the pilot symbols on the forward link and maintains a list of potential serving base stations/sectors. On the reverse link, the AT sends a DRC message every slot that indicates from which base station/sector and at which one of the twelve data rates it intends to receive data.

The AN receives the requests from multiple ATs in the system and schedules the data delivery to the terminals through the requested base stations/sectors and at the requested data rates using time division multiplexing techniques in a manner intended to balance overall throughput and to provide fairness. Once the AN decides to serve or allocate bandwidth to an AT, it delivers the packets from the base station/sector requested by the AT and at the rate requested by the AT starting two slots after the transmission of the corresponding DRC information. For packets comprising multiple slots, the time slots are not transmitted consecutively. Instead, the time slots are separated by a 3-slot interval to allow time for acknowledgements from the AT to reach the AN.

As discussed above, the ATs determine the DRC information based on measurements taken during receipt of pilot symbols. Because the base stations/sectors are synchronized in time, the signal received by an AT during the pilot symbol interval is the superposition of the pilot symbols from potential serving base stations/sectors. Based on these measurements, an AT may determine the signal-to-interference ratio (SIR) over the pilot symbol interval for potential serving base stations/sectors and the one with the highest SIR is selected as the serving base station/sector. The highest sustainable data rate at this SIR may then be selected as the requested rate to be included as part of the DRC information to be fed back to the AN. Unfortunately, this may result in a more pessimistic data rate estimate than may otherwise be achieved inasmuch as all base stations/sectors transmit during the pilot interval and this may not always be the case during the data intervals.

SUMMARY OF THE INVENTION

According to some embodiments of the present invention, bandwidth is allocated in a radio packet data system by sending achievable data rate estimate information from an access terminal to an access network. The achievable data rate estimate information is associated with scenarios corresponding to state combinations of a plurality of transmitters in the access network in which each transmitter is in either a serving, active, or idle state and one or more of the plurality of transmitters is in the idle state in one or more of the scenarios.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figures 1A, 1B:
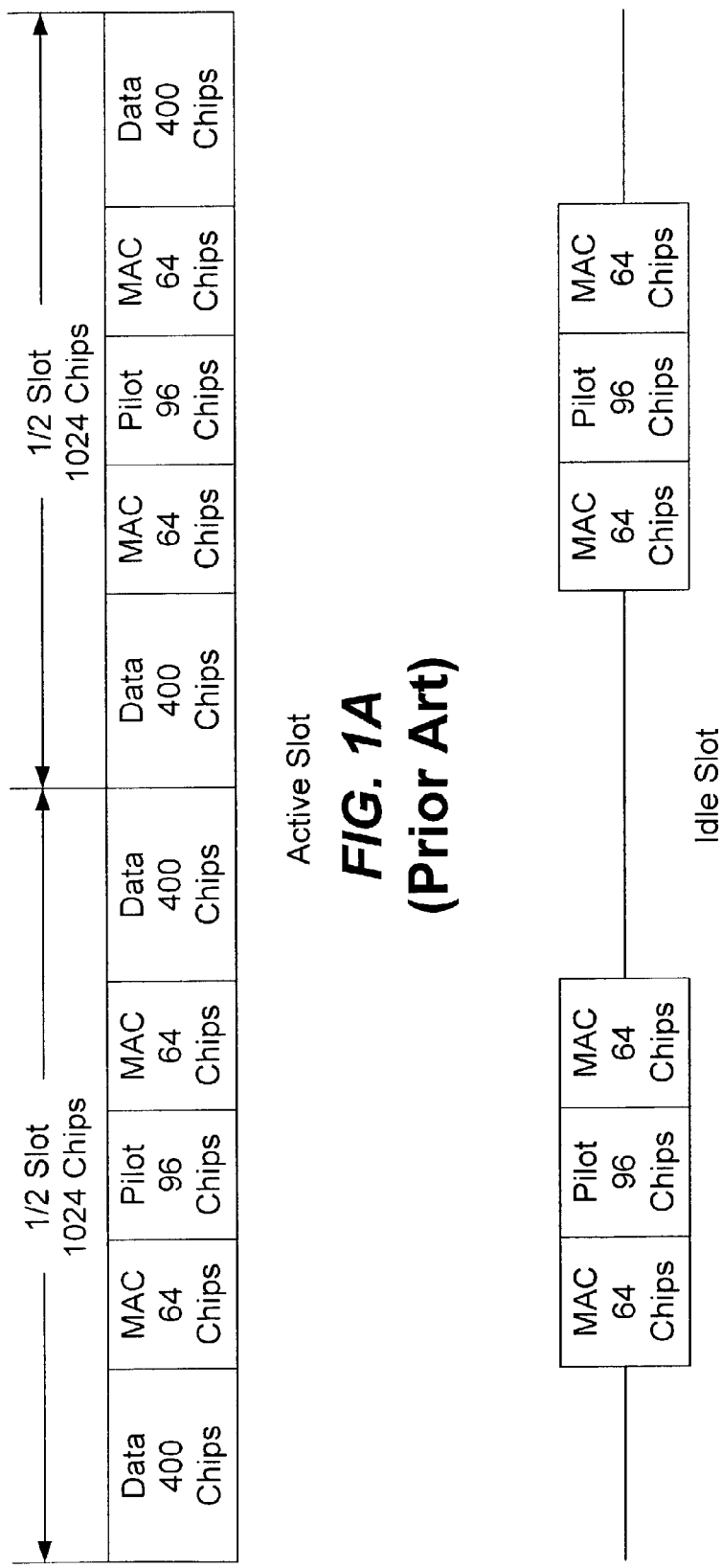
FIGS. 1A and 1B illustrate active and idle time slots structures, respectively, for a high data rate (HDR) radio packet data system.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as systems, methods, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 2:
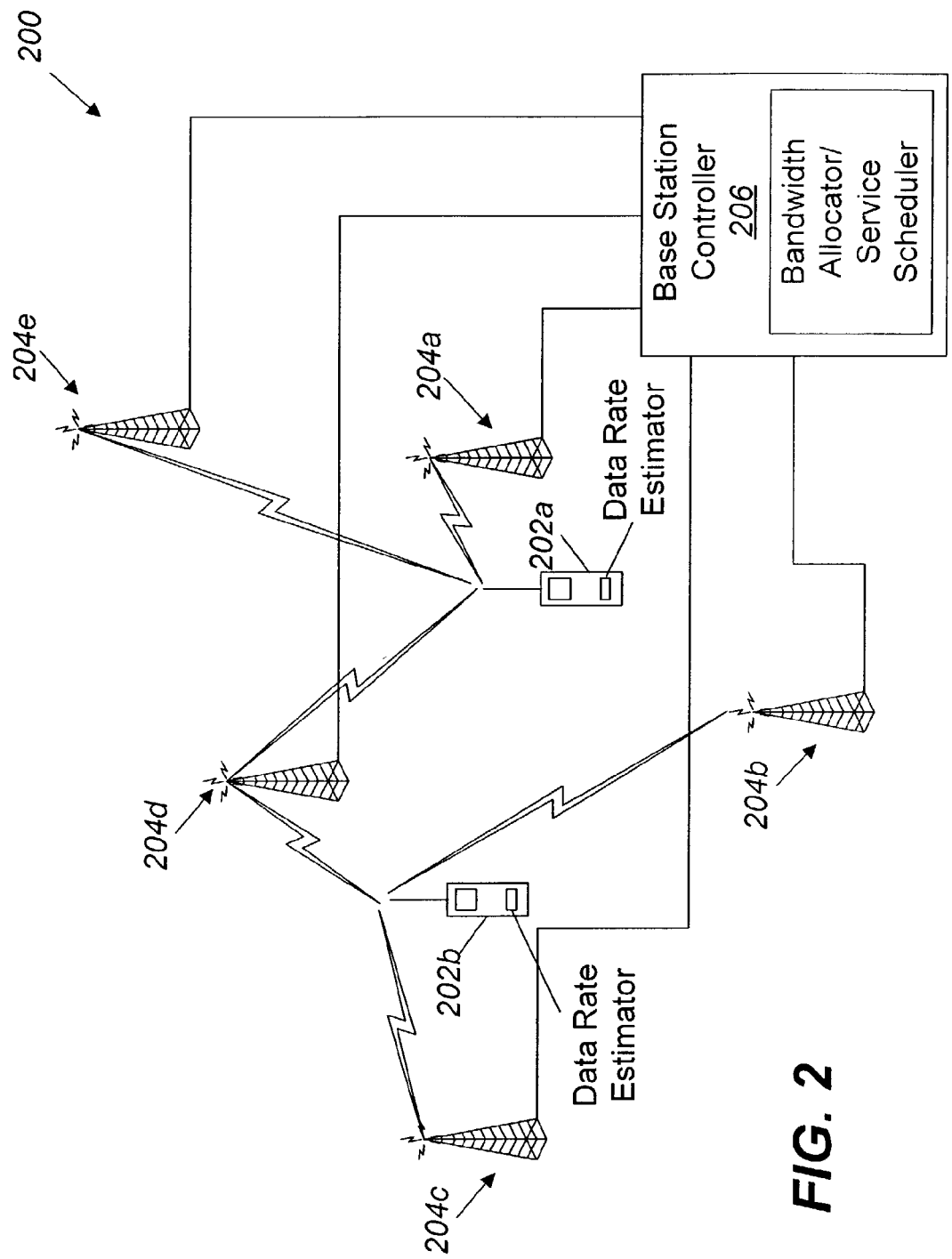
FIG. 2 is a network schematic that illustrates a radio packet data system in accordance with embodiments of the present invention.

Referring now to FIG. 2, an exemplary radio packet data system 200, in accordance with embodiments of the present invention, comprises one or more access terminals (ATs) 202a,b, a plurality of mobile data base stations (MDBSs) 204a,b,c,d,e, and one or more base station controllers 206. As used herein, the term "access terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/intranet access, Web browser, organizer, calendar and/or a GPS receiver; and a conventional laptop and/or palmtop receiver or other appliance that includes a radiotelephone transceiver. Access terminals may also be referred to as "pervasive computing" devices. The MDBSs may be associated with service "fsectors."The access terminals 202a,b communicate via the plurality of mobile data base stations (MDBSs) 204a,b,c,d,e. As used herein, the term "communicate" means transmit, receive, and/or both transmit and receive. A function of the MDBSs 204a,b,c,d,e is to handle radio communication with the access terminals 202a,b. In this capacity, the MDBSs 204a,b,c,d,e may function as a relay station for data and/or voice signals. Thus, each MDBS may comprise a receiver and a transmitter. For purposes of illustration, only five MDBSs 204a,b,c,d,e are shown in FIG. 2. It will be understood, however, that the radio packet data system 200 may comprise hundreds of MDBSs, and may serve thousands of access terminals. According to embodiments of the presenti invention, one or more of the access terminals 202a,b comprises a data rate estimator module, which may be configured to determine signal-to-interference (SIR) (Ec/Nt) ratios for communcation channels and/or to estimate achievable data rates for communication with various MDBSs/sectors.

The MDBSs 204a,b,c,d,e may also communicate with the base station controller 206. The base station controller 206 may comprise stored program control and processor resources for managing the radio packet data system 200. According to embodiments of the present invention, these resources include a bandwidth allocator/service scheduler module, which may be configured to process SIRs and/or achievable data rate estimates received from access terminals in a radio packet data system and to schedule data delivery to the access terminals. It will be understood that, in accordance with other embodiments of the present invention, the functionality associated with the bandwidth allocator/service scheduler module may be implemented in another data processing system, in one of the MDBSs 204a,b,c,d,e, or distributed throughout the MDBSs 204a,b,c,d,e or another distributed processing system. The communication connection between the MDBSs 204a,b,c,d,e and the base station controller 206 may be, for example, but not limited to, a wireless connection, a wireline connection, and/or an input/output bus interface that may facilitate the exchange of information between devices for MDBSs 204a,b,c,d,e that are co-located with the base station controller 206.

Although FIG. 2 illustrates an exemplary radio packet data network 200 architecture, it will be understood that the present invention is not limited to such a configuration, but is intended to encompass any configuration capable of carrying out the operations described herein.

Figure 3:
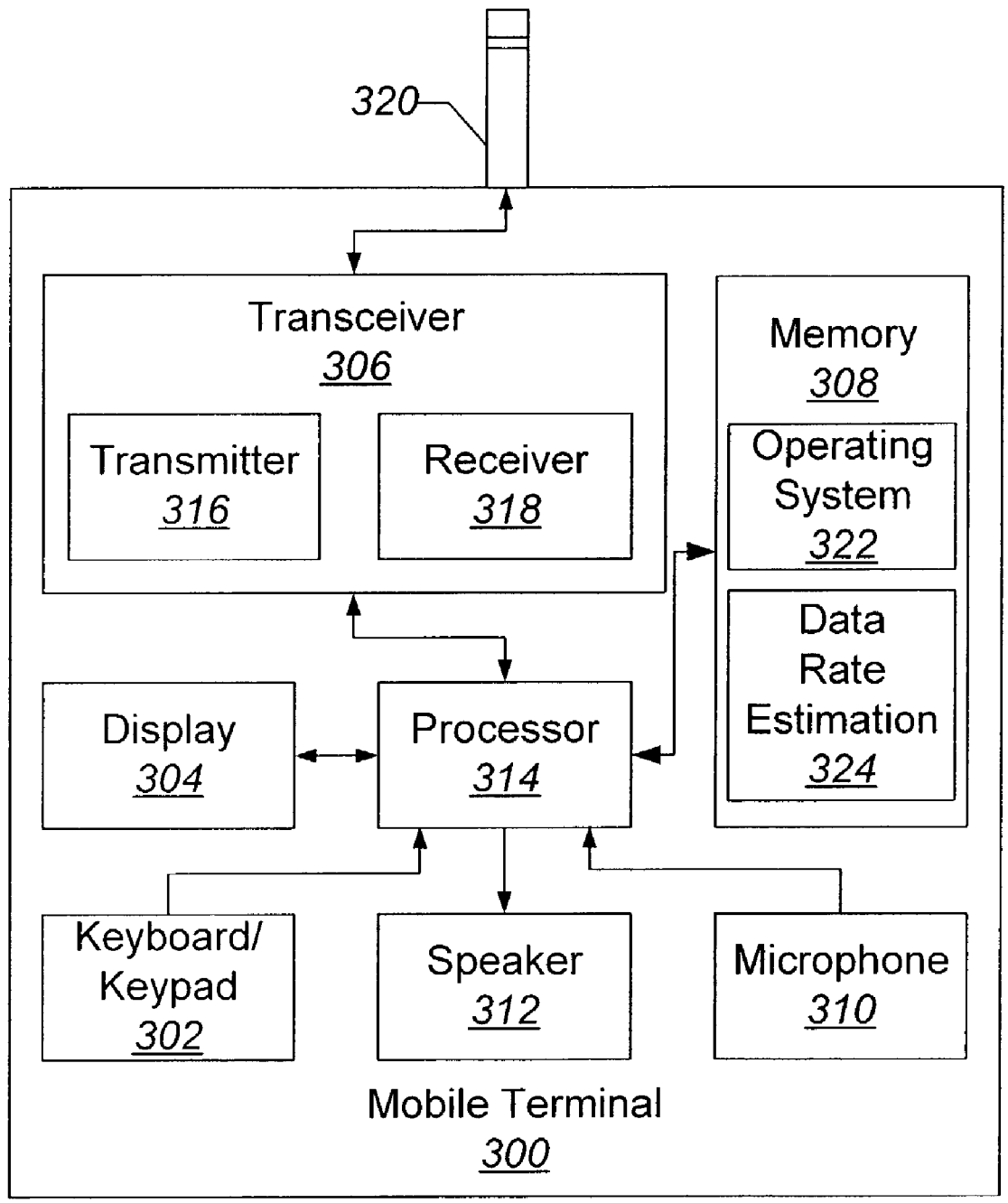
FIG. 3 is a block diagram that illustrates an access terminal in accordance with embodiments of the present invention.

FIG. 3 illustrates an access terminal 300 that may be used in embodiments of the access terminals 202a,b of FIG. 2, in accordance with the present invention. The access terminal 300 comprises a keyboard/keypad 302, a display 304, a transceiver 306, a memory 308, a microphone 310, and a speaker 312 that communicate with a processor 314. The transceiver 306 typically comprises a transmitter circuit 316 and a receiver circuit 318, which cooperate to transmit and receive radio frequency signals to MDBSs via an antenna 320. The radio frequency signals transmitted between the mobile terminal 300 and the MDBSs may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the access terminal 300 may be included in many conventional access terminals and their functionality is generally known to those skilled in the art.

The processor 314 communicates with the memory 308 via an address/data bus. The processor 314 may be, for example, a commercially available or custom microprocessor. The memory 308 is representative of the one or more memory devices containing the software and data used to determine achievable data rate estimates, which may be communicated to a radio packet data system access network for use in allocating bandwidth in the radio packet data system, in accordance with embodiments of the present invention. The memory 308 may include, but is not limited to, the following types of devices: cache, ROM, PROM, EPROM, EEPROM, flash, SRAM, and DRAM.

As shown in FIG. 3, the memory 308 may contain up to two or more categories of software and/or data: the operating system 322 and the data rate estimation module 324. The operating system 322 generally controls the operation of the access terminal. In particular, the operating system 322 may manage the access terminal's software and/or hardware resources and may coordinate execution of programs by the processor 314. The data rate estimation module 324 may be configured to determineSIR ratios for channels used to communicate with various MDBSs/sectors, which may be candidates for serving the access terminal. These SIRs may be used to estimate achievable data rates for communication with the various MDBSs/sectors.

As discussed above, conventional access terminals may compute SIRs and/or achievable data rate estimates for serving MDBSs/sectors based on measurements taken during pilot symbol transmission intervals. The MDBS/sector associated with the channel exhibiting the highest SIR and maximum achievable data rate estimate is selected as the serving MDBS/sector and the access terminal communicates this data rate and SIR to the selected MDBS/sector as a requested data rate. Thus, conventional access terminals may submit a requested data rate to the access network that is estimated based on a single scenario in which all potential MDBSs/sectors are active (i.e., transmitting). According to embodiments of the present invention, the data rate estimation module 324 may be configured to determine channel SIRs and achievable data rate estimates for one or more scenarios in which one or more potential serving MDBSs/sectors are idle based on measurements taken during pilot symbol transmission intervals using conventional estimation techniques.

Although FIG. 3 illustrates an exemplary software architecture that may be used to determine achievable data rate estimate information, which may be communicated to a radio packet data system access network for use in allocating bandwidth in the radio packet data system, it will be understood that the present invention is not limited to such a configuration but is intended to encompass any configuration capable of carrying out the operations described herein.

Figure 4:
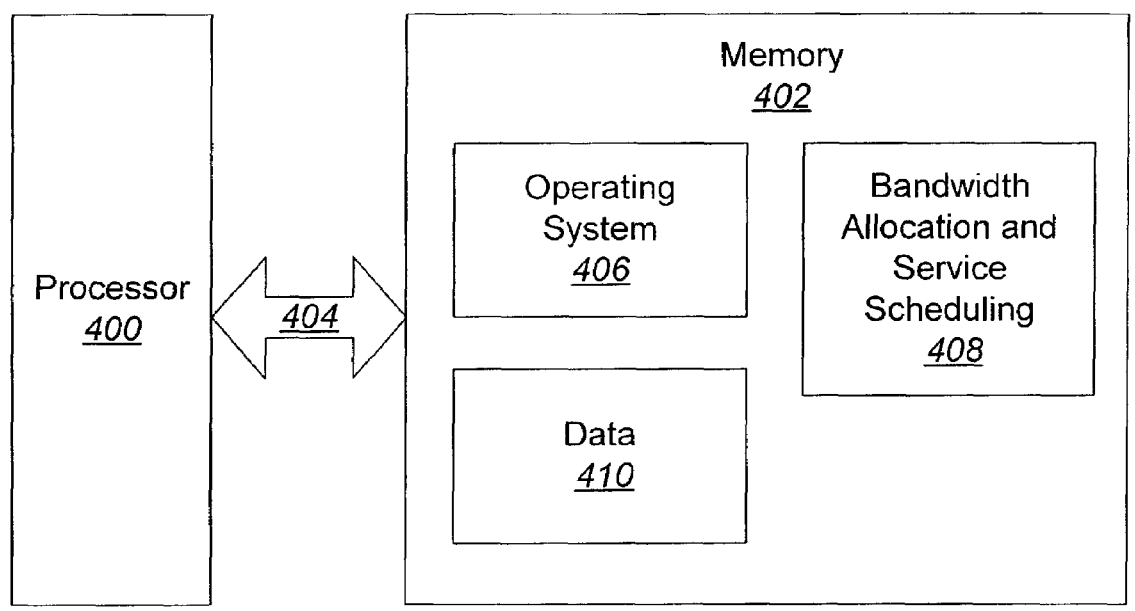
FIG. 4 is a block diagram that illustrates a software architecture for use in base stations in accordance with embodiments of the present invention.

FIG. 4 illustrates a processor 400 and a memory 402 that may be used in embodiments of the base station controller 206 of FIG. 2 in accordance with the present invention. The processor 400 communicates with the memory 402 via an address/data bus 404. The processor 400 may be, for example, a commercially available or custom microprocessor. The memory 402 is representative of the one or more memory devices containing the software and data used to allocate bandwidth in a radio packet data system in accordance with embodiments of the present invention. The memory 402 may include, but is not limited to, the following types of devices: cache, ROM, PROM, EPROM, EEPROM, flash, SRAM, and DRAM.

As shown in FIG. 4, the memory 404 may contain up to three or more categories of software and/or data: an operating system 406, a bandwidth allocation and service scheduling module 408, and a data module 410. The operating system 406 generally controls the operation of the base station controller. In particular, the operating system 406 may manage the base station controller's software and/or hardware resources and may coordinate execution of programs by the processor 400. The bandwidth allocation and service scheduling module 408 may be configured to process SIRs and/or achievable data rate estimates received from access terminals in a radio packet data system and to schedule data delivery to the access terminals using various multiplexing techniques, such as TDMA, CDMA, and or FDMA, in a manner intended to balance overall throughput and to provide fairness. The data module 410 may contain the SIR and/or achievable data rate estimates that are received from the access terminals in the radio packet data system.

Although FIG. 4 illustrates an exemplary base station controller software architecture that may facilitate bandwidth allocation in a radio packet data system in accordance with embodiments of the present invention, it will be understood that the present invention is not limited to such a configuration but is intended to encompass any configuration capable of carrying out operations described herein.

Computer program code for carrying out operations of the respective access terminal and base station controller program modules discussed above with respect to FIGS. 3 and 4 may be written in a high-level programming language, such as C or C++, for development convenience. En addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, systems, and computer program products in accordance with exemplary embodiments of the invention. These flowchart and/or block diagrams further illustrate exemplary operations of the radio packet data system, acccess terminal, and software architectures of FIGS. 2-4. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 5:
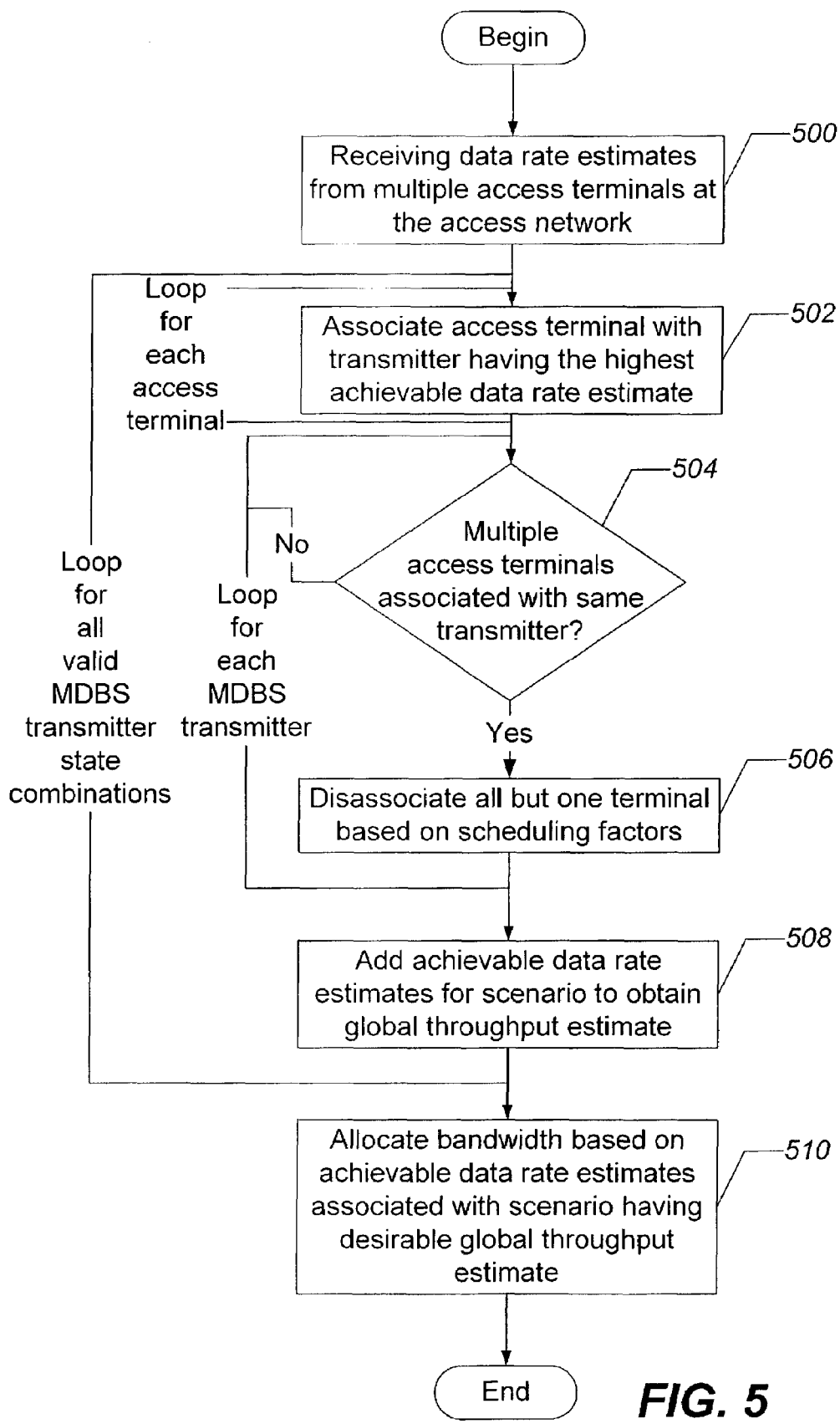
FIGS. 5 and 6 are flowcharts that illustrate operations for allocating bandwidth in a radio packet data system in accordance with embodiments of the present invention.

Referring now to FIG. 5, operations begin at block 500 where the access terminals (e.g., access terminals 202a,b of FIG. 2) in a radio packet data system send SIRs and/or achievable data rate estimates to the access network where they are received by the MDBSs (e.g., MDBSs 204a,b,c,d,e of FIG. 2) and are forwarded to the base station controller (e.g., base station controller 206 of FIG. 2). As discussed above, each access terminal may communicate achievable data rate estimate information to the access network corresponding to one or more scenarios in which one or more potential serving MDBSs/sectors are idle. This may be illustrated by way of example. An access terminal that may receive data from three potential MDBS/sector transmitters may submit twelve achievable data rate estimates to the access network, which correspond to the transmitter state combinations of Table 1 below:

TABLE 1

| Transmitter 1 | Transmitter 2 | Transmitter 3 |
|---|---|---|
| Serving | Idle | Idle |
| Serving | Idle | Active |
| Serving | Active | Idle |
| Serving | Active | Active |
| Idle | Serving | Idle |
| Idle | Serving | Active |
| Active | Serving | Idle |
| Active | Serving | Active |
| Idle | Idle | Serving |
| Idle | Active | Serving |
| Active | Idle | Serving |
| Active | Active | Serving |

As illustrated by Table 1, the access terminal may determine achievable data rate estimates based on each potential transmitter being a serving transmitter in combination with the other transmitters being in all possible combinations of idle and active (i.e., serving another access terminal) states.

The base station controller's bandwidth allocation and service scheduling module 408 processes the received achievable data rate estimates and/or SIRs by looping over all valid MDBS transmitter state combinations in the access network and, within this outer loop, looping over each access terminal to associate each respective access terminal with the MDBS transmitter having the highest achievable data rate estimate at block 502. This may be illustrated by way of example. A table may be constructed for each valid combination of MDBS transmitter states that contains the achievable data rate estimates submitted by the various access terminals for that state combination. For example, Table 2 illustrates an exemplary table constructed for a radio packet data system that comprises eight access terminals and four MDBS transmitters of which three are active and one is idle.

TABLE 2

| | | AT1 (idle) | AT2 (active) | AT3 (active) | AT4 (idle) | AT5 (idle) | AT6 (idle) | AT7 (idle) | AT8 (active) |
|---|---|---|---|---|---|---|---|---|---|
| XMIT1 (active) | SIR/rate | N/A | 4.66/1.228 M | −5.66/307200 | N/A | N/A | N/A | N/A | 8.10/1.843 M |
| XMIT2 (idle) | SIR/rate | N/A | N/A | N/A | N/A | N/A | N/A | N/A | N/A |
| XMIT3 (active) | SIR/rate | N/A | −6.86/153600 | −12.15/38400 | N/A | N/A | N/A | N/A | −36.67/0 |
| XMIT4 (active) | SIR/rate | N/A | −47.05/0 | 1.56/614400 | N/A | N/A | N/A | N/A | −36.01/0 |

Applying the operations of block 502 to the Table 2 example, AT2 is associated with transmitter 1, AT3 is associated with transmitter 4, and AT8 is also associated with transmitter 1. This results in two access terminals (AT2 and AT8) being associated with the same MDBS transmitter (transmitter 1).

Returning to FIG. 5, the bandwidth allocation and service scheduling module 408 loops over each MDBS transmitter to determine whether each respective transmitter has multiple access terminals associated therewith at block 504. If multiple access terminals are associated with the same MDBS transmitter, then all access terminals but one are disassociated with that MDBS transmitter and associated, if possible, with another MDBS transmitter at block 506 based on scheduling factors, such as traffic loading and/or respective ratios of the requested data rate to the average received data rate for access terminals. For example, with respect to the Table 2 example, access terminal AT8 requests a higher data rate than access terminal AT2;

however, if access terminal AT8 has a higher average received data rate than access terminal AT2, then AT8 may be associated with MDBS transmitter 1 and access terminal AT2 may be disassociated with MDBS transmitter 1 for possible association with another MDBS transmitter.

For purposes of illustration, it is assumed that access terminals AT2 and AT8 have the same average received data rates, which results in access terminal AT8 being associated with MDBS transmitter 1. The bandwidth allocation and service scheduling module 408 may attempt to associate access terminal AT2 with another transmitter by deleting or discarding the associated MDBS transmitters (transmitters 1 and 4 from the Table 2 example) and access terminals (AT3 and AT8 from Table 2), and then repeating the operations of blocks 502, 504, and 506. This is illustrated in Table 3 below:

TABLE 3

|  |  | AT1 (idle) | AT2 (active) | AT3 (delete) | AT4 (idle) | AT5 (idle) | A16 (idle) | AT7 (idle) | AT8 (delete) |
|---|---|---|---|---|---|---|---|---|---|
| XMIT1 (delete) | SIR/rate | N/A | N/A | N/A | N/A | N/A | N/A | N/A | N/A |
| XMIT2 (idle) | SIR/rate | N/A | N/A | N/A | N/A | N/A | N/A | N/A | N/A |
| XMIT3 (active) | SIR/rate | N/A | −6.86/153600 | N/A | N/A | N/A | N/A | N/A | N/A |
| XMIT4 (delete) | SIR/rate | N/A | N/A | N/A | N/A | N/A | N/A | N/A | N/A |

In this example, access terminal AT2 may be associated with MDBS transmitter 3.

Returning to FIG. 5, the bandwidth allocation and service scheduling module 408 adds the achievable data rate estimates for the access terminals that have been successfully associated with an MDBS transmitter for the particular MDBS transmitter state scenario to obtain a global throughput estimate for the radio packet data system at block 508. Once global throughput estimates have been obtained for all the valid MDBS transmitter state combinations or scenarios at block 508, then the bandwidth allocation and service scheduling module 408 may allocate bandwidth to the access terminals in the radio packet data system at block 510 based on the MDBS transmitter state combination or scenario that has a desirable (e.g., highest) global throughput estimate.

As discussed above with respect to block 500 of FIG. 5 an access terminal may communicate achievable data rate estimates to the access network corresponding to one or more scenarios in which one or more potential serving MDBSs/sectors are idle. As illustrated in Table 1 above, an access terminal may communicate achievable data rate estimates to the access network for scenarios corresponding to all possible state (e.g., serving active, or idle) combinations of the MDBS transmitters in the access network from which the access terminal may receive service. This may be a large amount of information, however, to transmit on the uplinks between the access terminals and the access network. Thus, in other embodiments of the present invention, the data rate estimate information communicated from an access terminal to the access network may be limited to scenarios that are associated with a subset of all possible combinations of potential serving MDBS transmitter states.

Figure 6:
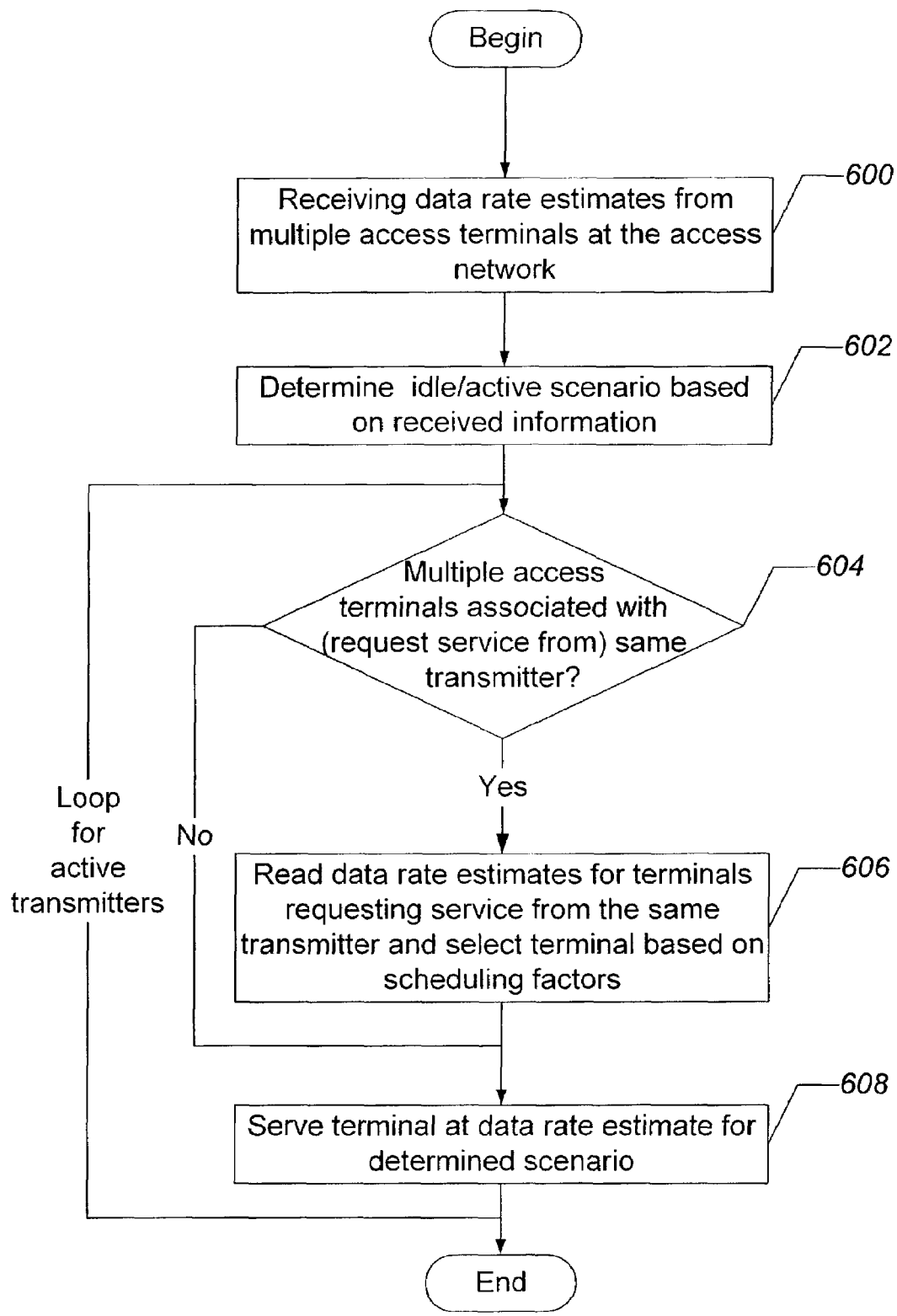

Referring now to FIG. 6, operations begin at block 600 where access terminals may respectively designate one MDBS transmitter/sector as a serving transmitter/sector and then communicate SIRs and/or achievable data rate estimates to the access network, which are based on scenarios corresponding to possible state combinations of the MDBS transmitters from which the respective access terminals may receive service, but in which one of the MDBS transmitters is designated as the serving transmitter while the other transmitters may assume idle and active states. The MDBSs (e.g., MDBSs 204a,b,c,d,e of FIG. 2) receive the SIRs and/or achievable data rate estimates and forward these data to the base station controller (e.g., base station controller 206 of FIG. 2).

The information forwarded to the access network is a subset of the information contained in Table 1 above. Referring again to the example of Table 1, an access terminal may designate MDBS transmitter 1 as a serving transmitter. Thus, only the information contained in Table 4 below, which corresponds to the first one-third of Table 1, need be communicated to the access network.

TABLE 4

| Transmitter 1 | Transmitter 2 | Transmitter 3 |
|---|---|---|
| Serving | Idle | Idle |
| Serving | Idle | Active |
| Serving | Active | Idle |
| Serving | Active | Active |

The base station controller's bandwidth allocation and service scheduling module 408 processes the received achievable data rate estimates and/or SIRs by determining an idle/active scenario for the MDBS transmitters and the access terminals based on the received information at block 602. For each serving MDBS transmitter, a determination is made if multiple access terminals have requested service from the MDBS transmitter at block 604. If multiple access terminals have requested service from the same MDBS transmitter, then data rate estimates for those access terminals are read and one of the terminals is selected at block 606 based on scheduling factors, such as traffic loading and/or respective ratios of the requested data rate to the average received data rate for access terminals discussed above with respect to block 506 of FIG. 5. The MDBS transmitter provides service to the selected terminal or the sole terminal requesting service at the data rate estimate for the determined idle/active scenario at block 608. Note that because each access terminal designates a single MDBS transmitter/sector for service, non-selected access terminals are not associated with another MDBS transmitter/sector.

Thus, in environments in which the communication channel quality between the MDBSs and the access terminals changes relatively slowly, it may be preferable to send more SIR/achievable data rate estimate information from the access terminals to the access network, as discussed above with reference to FIG. 5, to provide the access network with greater flexibility in serving the access termninals. Conversely, in environments in which the communication quality between the MDBSs and the access terminals changes more frequently, it may be preferable for the access terminals to designate serving MDBS transmitters/sectors to reduce the amount of SIR/achievable data rate estimate information to be sent to the access network as discussed above with reference to FIG. 6.

In other embodiments, an access terminal may use blind detection techniques to determine whether potential serving MDBS transmitters/sectors are in an idle or active state during data transmission intervals. Using this additional knowledge, the number of scenarios (e.g., potential serving MDBS transmitter state combinations) may be reduced for which the access terminals provide SIRs/achievable data rate estimates. For a system without forward activity broadcast, blind detection techniques may provide additional information for the terminal to make a sector selection and therefore enable it to receive a higher data rate from the network. For example, an access terminal may avoid requesting data from an MDBS transmitter/sector that is heavily loaded even if it has the strongest signal.

For the HDR system described above, the baseband equivalent received samples corresponding to the data field over an observation period of N samples can be modeled as, $$r(n) = \sum_{k=1}^{K} I_k \sum_{l=1}^{L} c_{k,l} s_k(n - \tau_{k,l}) + z(n), \quad (1)$$

for n=1, ..., N, where K is the number of sectors in the network, L is the number of multipaths in the channel, $c_{k,l}$ and $\tau_{k,l}$ are the channel coefficients and delay of the l'th path from the k'th sector, $s_k(n)$ is the spread spectrum signal with unit variance sent by the k'th sector, z(n) is an Additive White Gaussian Noise (AWGN) with variance $N_0$, and $I_k$ is the on/off indicator of the k'th sector. For simplification of notations the following symbols are defined:

$r = [r(1) r(2) \ldots r(N)]^T$ $z = [z(1) z(2) \ldots z(N)]^T$ $I = [I_1 I_2 \ldots I_K]^T$ $s_k = [s_k(1) s_k(2) \ldots s_k(N)]^T$ $$S = [s_1 s_2 \ldots s_K] \quad (2)$$

Note that the only unknowns in Equation (1) are the AWGN (with a known variance), the spread spectrum signal $s_k(n)$, and the indicator $I_k$. The rest of the parameters can all be obtained over the pilot bursts. Therefore, the problem becomes one of detecting the indicator I from the received samples r.

The Maximal Likelihood (ML) detector for I is to find a value of I that maximizes the conditional probability density function of the received samples r given the indication vector:

$$\hat{I} = \underset{I}{\operatorname{argmax}}\, f(r \mid I) \quad (3)$$
$$= \underset{I}{\operatorname{argmax}} \sum_{S} p(S \mid I) f(r \mid S, I)$$
$$= \underset{I}{\operatorname{argmax}} \sum_{S} p(S) f(r \mid S, I)$$

Some manipulation leads to the following:

$$f(r \mid S, I) \propto \exp\left\{-\frac{1}{N_0} \sum_{n=1}^{N} \left| r(n) - \sum_{k=1}^{K} I_k \sum_{l=1}^{L} c_{k,l} s_k(n - \tau_{k,l}) \right|^2 \right\} \propto \quad (4)$$

$$\exp\left\{\frac{1}{N_0} \sum_{k=1}^{K} I_k \cdot 2\Re\left[\sum_{l=1}^{L} c_{k,l}^* \sum_{n=1}^{N} r(n) s_k^*(n - \tau_{k,l})\right]\right\} \times$$

$$\exp\left\{-\frac{1}{N_0} \sum_{n=1}^{N} \left| \sum_{k=1}^{K} I_k \sum_{l=1}^{L} c_{k,l} s_k(n - \tau_{k,l}) \right|^2 \right\}$$

The last term in Equation (4), however, involves cross correlation between pairs of $s_k$'s and therefore may be computationally too complicated to intergrate over all possible realizations of S. Two simplified approaches are described hereafter.

The expected value of the power of the received samples conditioned on the indication vector I is given by $$P_r(I) \triangleq E\{|r(n)|^2 \mid I\} = \sum_{k=1}^{K} I_k \sum_{l=1}^{L} |c_{k,l}|^2 + N_0 \quad (5)$$

This can be estimated by the sample mean of the received samples:

$$\hat{P}_r = \frac{1}{N} \sum_{n=1}^{N} |r(n)|^2 \quad (6)$$

Therefore, an approach to detecting the indication vector I is as follows:

1. Compute $P_r(I)$, the conditional expected value of the power of the received samples, for each hypothesis of I using Equation (5).
2. Compute $\hat{P}_r$, the sample mean of $|r(n)|^2$, using Equation (6).
3. The forward activity is detected by selecting the hypothesis with the smallest error between $P_r(I)$ and $\hat{P}_r$, i.e., $$\hat{I} = \arg\min_I |P_r(I) - \hat{P}_r| \quad (7)$$

The first approach assumes no knowledge about the statistical characteristic of the spread spectrum signal. In practice, the spread spectrum signal is a sequence of modulated symbols from a known constellation, such as QPSK, 8-PSK or 16-QAM. In HDR, this modulation is most likely QPSK. To exploit this property while at the same time avoiding the complicated approach given in Equation (3), some pre-processing of the received samples r may be performed before the detection takes place. For the k'th sector, calculated the following:

$$q_k(n) \triangleq \frac{1}{E_k} \sum_{m=1}^{L} c_{k,m}^* r(n + \tau_{k,m}) \quad (8)$$

for n = 1, ..., N, where $$E_k = \sum_{m=1}^{L} |c_{k,m}|^2 \quad (9)$$

By collecting all the terms containing $s_k(n)$ into one term, Equation (8) can be written as:

$$q_k(n) = I_k s_k(n) + z_k(n), \quad (10)$$

where the sum of the remaining terms and the AWGN are denoted by $z_k(n)$. It can be shown that given the indication vector I, $z_k(n)$ can be approximated by a conditionally independent Gaussian random variable with a variance givey by:

$$\sigma_{z_k}^2(I) \triangleq E[|z_k(n)|^2 \mid I] = \qquad (11)$$

$$\frac{1}{E_k^2}\left(\sum_{j=1}^{K} I_k \sum_{l=1}^{L}\sum_{m=1}^{L} |c_{j,l}c_{k,m}^*|^2 - I_k \sum_{m=1}^{L} |c_{k,m}|^4 + N_0 E_k\right)$$

Therefore, the probability density function of $q_k(n)$ conditioned on I and $s_k(n)$ is given by:

$$f(q_k(n) \mid s_k(n), I) = \frac{1}{\pi \sigma_{z_k}^2(I)} \exp\left\{-\frac{|q_k(n) - I_k s_k(n)|^2}{\sigma_{z_k}^2(I)}\right\} \qquad (12)$$

The detection problem is now converted into one of detecting the indication vector I from the processed received samples $q_k(n)$, where k=1, ..., K and n=1, ..., N. Let Q and $q_1, \ldots, q_k$ be similarly defined as in Equation (2), then the conditional probability density function of the processed received samples Q given the indication vector I is given by:

$$f(Q \mid I) = \sum_{S} p(S \mid I) f(Q \mid S, I) \qquad (13)$$

$$= \sum_{S} p(S) \prod_{k=1}^{K} f(q_k \mid s_k, I)$$

$$= \sum_{S} p(S) \prod_{k=1}^{K} \prod_{n=1}^{N} f(q_k(n) \mid s_k(n), I)$$

$$= \prod_{k=1}^{K} \prod_{n=1}^{N} \sum_{s_k(n)} p(s_k(n)) f(q_k(n) \mid s_k(n), I),$$

and its log-likelihood function is given by:

$$\Lambda(Q \mid I) \triangleq \ln[f(Q \mid I)] \qquad (14)$$

$$= \sum_{k=1}^{K} \sum_{n=1}^{N} \ln\left[\sum_{s_k(n)} p(s_k(n)) f(q_k(n) \mid s_k(n), I)\right]$$

$$\triangleq \sum_{k=1}^{K} \sum_{n=1}^{N} \lambda_{k,n}(q_k(n) \mid I)$$

The calculation of $\lambda_{k,n}(q_k(n)|I)$ involves $s_k(n)$ and, therefore, is relatively straight-forward. For QPSK, it can be shown that $$\lambda_{k,n}(q_k(n) \mid I) = I_k \cdot [com[x_{k,n}(I), -x_{k,n}(I)] + \qquad (15)$$
$$com[y_{k,n}(I), -y_{k,n}(I)] -$$
$$\frac{1}{\sigma_{z_k}^2(I)} - \ln(4)] -$$
$$\frac{|q_k(n)|^2}{\sigma_{z_k}^2(I)} - \ln[\pi \sigma_{z_k}^2(I)]$$

where $\qquad (16)$ $$x_{k,n}(I) = \Re\left[\frac{\sqrt{2 q_k(n)}}{\sigma_z^2(I)}\right]$$

$$y_{k,n}(I) = \Im\left[\frac{\sqrt{2 q_k(n)}}{\sigma_{z_k}^2(I)}\right],$$

and $\qquad (17)$ $$com(x, y) \triangleq \ln(e^x + e^y).$$

In summary, the detection method described above comprises the following steps:

1. Compute $q_k(n)$ for k=1, ... K and n=1, ..., N according to Equations (8) and (9).
2. For each hypothesis of I, compute its corresponding log-likelihood function $\Lambda(Q|I)$ according to Equations (14), (15), (16) and (17).
3. The forward activity is detected by selecting the hypothesis with the largest log-likelihood value:

$$\hat{I} = \arg\max \Lambda(Q|I) \qquad (18)$$

The flowcharts of FIGS. 5 and 6 illustrate the architecture, functionality, and operations of embodiments of the access terminal 300 and the base station controller 206 software. In this regard, each block represents a module, segment, or portion of code, which comprises one or more executable instructions for implementing the specified logical function(s). It should also be noted that in other implementations, the function(s) noted in the blocks may occur out of the order noted in FIGS. 5 and 6. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

We claim:

1. A method of operating a radio packet data system, comprising:

receiving achievable data rate estimate information between ones of a plurality of access terminals and ones of a plurality of transmitters at an access network;

for each one of the plurality of access terminals, associating one of the plurality of transmitters having a highest achievable data rate estimate associated therewith with the respective access terminal;

determining whether respective ones of the plurality of transmitters have been associated with multiple ones of the plurality of access terminals; and for each one of the plurality of transmitters that is associated with multiple ones of the plurality of access terminals, disassociating all but one of the multiple ones of the plurality of access terminals with the respective transmitter based on service scheduling factors respectively associated with the multiple ones of the plurality of access terminals.

2. The method of claim 1, further comprising:
discarding each one of the plurality of transmitters having one of the plurality of access terminals associated therewith; and
for each disassociated one of the plurality of access terminals, associating a non-discarded one of the plurality of transmitters having a highest achievable data rate estimate associated therewith with the respective disassociated access terminal.

3. The method of claim 1, wherein respective ones of the service scheduling factors comprise respective ratios of achievable data rate estimates to average received data rates of the multiple ones of the plurality of access terminals.

4. The method of claim 1, further comprising:
using blind detection of channel activity at the ones of the plurality of access terminals to generate the achievable data rate estimation information.

5. A method of operating a radio packet data system, comprising:
performing the following for each of a plurality of scenarios corresponding to state combinations of a plurality of transmitters in an access network:
receiving achievable data rate estimate information between ones of a plurality of access terminals and ones of the plurality of transmitters at the access network;
for each one of the plurality of access terminals, associating one of the plurality of transmitters having a highest achievable data rate estimate associated therewith with the respective access terminal;
determining whether respective ones of the plurality of transmitters have been associated with multiple ones of the plurality of access terminals;
for each one of the plurality of transmitters that is associated with multiple ones of the plurality of access terminals, disassociating all but one of the multiple ones of the plurality of access terminals with the respective transmitter based on service scheduling factors respectively associated with the multiple ones of the plurality of access terminals; and
adding the achievable data rate estimates corresponding to any associated ones of the plurality of transmitters with ones of the plurality of access terminals to obtain a global throughput estimate for the respective one of the plurality of scenarios.

6. The method of claim 5, further comprising:
allocating bandwidth to the plurality of access terminals based on achievable data rate estimates associated with one of the plurality of scenarios having a highest global throughput estimate.

7. The method of claim 5, further comprising:
discarding each one of the plurality of transmitters having one of the plurality of access terminals associated therewith; and
for each disassociated one of the plurality of access terminals, associating a non-discarded one of the plurality of transmitters having a highest achievable data rate estimate associated therewith with the respective disassociated access terminal.

8. The method of claim 5, wherein respective ones of the service scheduling factors comprise respective ratios of achievable data rate estimates to average received data rates of the multiple ones of the plurality of access terminals.

9. A method of operating a radio packet data system, comprising:
performing the following for each of a plurality of access terminals:
designating one of a plurality of transmitters in an access network as a serving transmitter for the respective one of the plurality of access terminals; and
sending achievable data rate estimate information from the respective one of the plurality of access terminals to the access network, the achievable data rate information comprising scenarios corresponding to state combinations of at least one non-serving transmitter in the access network; then
performing the following for each of a plurality of scenarios corresponding to state combinations of the plurality of transmitters in the access network:
for each of the plurality of transmitters in the access network having achievable data rate estimates from multiple ones of the plurality of access terminals associated therewith, providing service to one of the plurality of access terminals associated therewith based on service scheduling factors.

10. The method of claim 9, wherein respective ones of the service scheduling factors comprise respective ratios of the achievable data rate estimates to average received data rates of the multiple ones of the plurality of access terminals.

11. A system for operating a radio packet data system, comprising:
means for receiving achievable data rate estimate information between ones of a plurality of access terminals and ones of a plurality of transmitters at an access network;
for each one of the plurality of access terminals, means for associating one of the plurality of transmitters having a highest achievable data rate estimate associated therewith with the respective access terminal;
means for determining whether respective ones of the plurality of transmitters have been associated with multiple ones of the plurality of access terminals; and
for each one of the plurality of transmitters that is associated with multiple ones of the plurality of access terminals, means for disassociating all but one of the multiple ones of the plurality of access terminals with the respective transmitter based on service scheduling factors respectively associated with the multiple ones of the plurality of access terminals.

12. The system of claim 11, further comprising:
means for discarding each one of the plurality of transmitters having one of the plurality of access terminals associated therewith; and
for each disassociated one of the plurality of access terminals, means for associating a non-discarded one of the plurality of transmitters having a highest achievable data rate estimate associated therewith with the respective disassociated access terminal.

13. The system of claim 11, wherein respective ones of the service scheduling factors comprise respective ratios of achievable data rate estimates to average received data rates of the multiple ones of the plurality of access terminals.

14. The system of claim 11, further comprising:
means for using blind detection of channel activity at the ones of the plurality of access terminals to generate the achievable data rate estimation information.

15. A system for operating a radio packet data system, comprising:

means for performing for each of a plurality of scenarios corresponding to state combinations of a plurality of transmitters in an access network, the means for performing comprising:

means for receiving achievable data rate estimate information between ones of a plurality of access terminals and ones of the plurality of transmitters at the access network;

for each one of the plurality of access terminals, means for associating one of the plurality of transmitters having a highest achievable data rate estimate associated therewith with the respective access terminal;

means for determining whether respective ones of the plurality of transmitters have been associated with multiple ones of the plurality of access terminals;

for each one of the plurality of transmitters that is associated with multiple ones of the plurality of access terminals, means for disassociating all but one of the multiple ones of the plurality of access terminals with the respective transmitter based on service scheduling factors respectively associated with the multiple ones of the plurality of access terminals; and means for adding the achievable data rate estimates corresponding to any associated ones of the plurality of transmitters with ones of the plurality of access terminals to obtain a global throughput estimate for the respective one of the plurality of scenarios.

16. The system of claim 15, further comprising:

means for allocating bandwidth to the plurality of access terminals based on achievable data rate estimates associated with one of the plurality of scenarios having a highest global throughput estimate.

17. The system of claim 15, further comprising:

means for discarding each one of the plurality of transmitters having one of the plurality of access terminals associated therewith; and for each disassociated one of the plurality of access terminals, means for associating a non-discarded one of the plurality of transmitters having a highest achievable data rate estimate associated therewith with the respective disassociated access terminal.

18. The system of claim 15, wherein respective ones of the service scheduling factors comprise respective ratios of achievable data rate estimates to average received data rates of the multiple ones of the plurality of access terminals.

19. A system for operating a radio packet data system, comprising:

first means for performing for each of a plurality of access terminals, the first means for performing comprising:

means for designating one of a plurality of transmitters in an access network as a serving transmitter for the respective one of the plurality of access terminals;

means for sending achievable data rate estimate information from the respective one of the plurality of access terminals to the access network, the achievable data rate estimate information comprising scenarios corresponding to state combinations of at least one non-serving transmitter in the access network; and second means, responsive to the means for sending, for performing for each of a plurality of scenarios corresponding to state combinations of the plurality of transmitters in the access network, the second means for performing comprising:

for each of the plurality of transmitters in the access network having achievable data rate estimates from multiple ones of the plurality of access terminals associated therewith, means for providing service to one of the plurality of access terminals associated therewith based on service scheduling factors.

20. The system of claim 19, wherein respective ones of the service scheduling factors comprise respective ratios of the achievable data rate estimates to average received data rates of the multiple ones of the plurality of access terminals.

21. A computer program product configured to operate a radio packet data system, comprising:

a computer readable storage medium having computer readable program code embodied therein, the computer readable program code comprising:

computer readable program code configured to receive achievable data rate estimate information between ones of a plurality of access terminals and ones of a plurality of transmitters at an access network;

for each one of the plurality of access terminals, computer readable program code configured to associate one of the plurality of transmitters having a highest achievable data rate estimate associated therewith with the respective access terminal;

computer readable program code configured to determine whether respective ones of the plurality of transmitters have been associated with multiple ones of the plurality of access terminals; and for each one of the plurality of transmitters that is associated with multiple ones of the plurality of access terminals, computer readable program code configured to disassociate all but one of the multiple ones of the plurality of access terminals with the respective transmitter based on service scheduling factors respectively associated with the multiple ones of the plurality of access terminals.

22. The computer program product of claim 21, further comprising:

computer readable program code configured to discard each one of the plurality of transmitters having one of the plurality of access terminals associated therewith; and for each disassociated one of the plurality of access terminals, computer readable program code configured to associate a non-discarded one of the plurality of transmitters having a highest achievable data rate estimate associated therewith with the respective disassociated access terminal.

23. The computer program product of claim 21, wherein respective ones of the service scheduling factors comprise respective ratios of achievable data rate estimates to average received data rates of the multiple ones of the plurality of access terminals.

24. The computer program product of claim 21, further comprising:

computer readable program code for using blind detection of channel activity at the ones of the plurality of access terminals to generate the achievable data rate estimation information.

25. A computer program product configured to operate a radio packet data system, comprising:

a computer readable storage medium having computer readable program code embodied therein, the computer readable program code comprising:

computer readable program code configured to perform for each of a plurality of scenarios corresponding to state combinations of a plurality of transmitters in an access network, the computer readable program code configured to perform comprising:

computer readable program code configured to receive achievable data rate estimate information between ones of a plurality of access terminals and ones of the plurality of transmitters at the access network;

for each one of the plurality of access terminals, computer readable program code configured to associate one of the plurality of transmitters having a highest achievable data rate estimate associated therewith with the respective access terminal;

computer readable program code configured to determine whether respective ones of the plurality of transmitters have been associated with multiple ones of the plurality of access terminals;

for each one of the plurality of transmitters that is associated with multiple ones of the plurality of access terminals, computer readable program code configured to disassociate all but one of the multiple ones of the plurality of access terminals with the respective transmitter based on service scheduling factors respectively associated with the multiple ones of the plurality of access terminals; and computer readable program code configured to add the achievable data rate estimates corresponding to any associated ones of the plurality of transmitters with ones of the plurality of access terminals to obtain a global throughput estimate for the respective one of the plurality of scenarios.

26. The computer program product of claim 25, further comprising:

computer readable program code configured to allocate bandwidth to the plurality of access terminals based on achievable data rate estimates associated with one of the plurality of scenarios having a highest global throughput estimate.

27. The computer program product of claim 25, further comprising:

computer readable program code configured to discard each one of the plurality of transmitters having one of the plurality of access terminals associated therewith; and for each disassociated one of the plurality of access terminals, computer readable program code configured to associate a non-discarded one of the plurality of transmitters having a highest achievable data rate estimate associated therewith with the respective disassociated access terminal.

28. The computer program product of claim 25, wherein respective ones of the service scheduling factors comprise respective ratios of achievable data rate estimates to average received data rates of the multiple ones of the plurality of access terminals.

29. A computer program product configured to operate a radio packet data system, comprising:

a computer readable storage medium having computer readable program code embodied therein, the computer readable program code comprising:

first computer readable program code configured to perform for each of a plurality of access terminals, the first computer readable program code configured to perform comprising:

computer readable program code configured to designate one of a plurality of transmitters in an access network as a serving transmitter for the respective one of the plurality of access terminals;

computer readable program code configured to send achievable data rate estimate information from the respective one of the plurality of access terminals to the access network, the achievable data rate information comprising scenarios corresponding to state combinations of at least one non-serving transmitter in the access network; and second computer readable program code, responsive to the computer readable program code configured to send, configured to perform for each of a plurality of scenarios corresponding to state combinations of the plurality of transmitters in the access network, the second computer readable program code configured to perform comprising:

for each of the plurality of transmitters in the access network having achievable data rate estimates from multiple ones of the plurality of access terminals associated therewith, computer readable program code configured to providing service to one of the plurality of access terminals associated therewith based on service scheduling factors.

30. The computer program product of claim 29, wherein respective ones of the service scheduling factors comprise respective ratios of the achievable data rate estimates to average received data rates of the multiple ones of the plurality of access terminals.

* * * * *

UNITED STATES PATENT AND TRADEMARK OFFICE
CERTIFICATE OF CORRECTION

PATENT NO. : 7,313,110 B2
APPLICATION NO. : 10/267223
DATED : December 25, 2007
INVENTOR(S) : Guey et al.

It is certified that error appears in the above-identified patent and that said Letters Patent is hereby corrected as shown below:

In Column 3, Line 62, delete ""fsectors."" and insert -- "sectors." --, therefor.

In Column 9, in Table 3, Line 1, delete "A16" and insert -- AT6 --, therefor.

In Column 9, Line 23, delete "all" and insert -- all --, therefor.

In Column 12, Line 41, in Equation (7), delete " $\hat{I}=\arg\min |P_r(I)-\hat{P}_r|$ " and insert -- $\hat{I} = \arg\min_I |P_r(I) - \hat{P}_r|$ --, therefor.

Signed and Sealed this

Fourteenth Day of October, 2008

JON W. DUDAS
*Director of the United States Patent and Trademark Office*